July 15, 1924.
C. V. ZOUL
1,501,877
PROCESS FOR DE-EMULSIFYING LIQUIDS
Filed Dec. 11, 1922
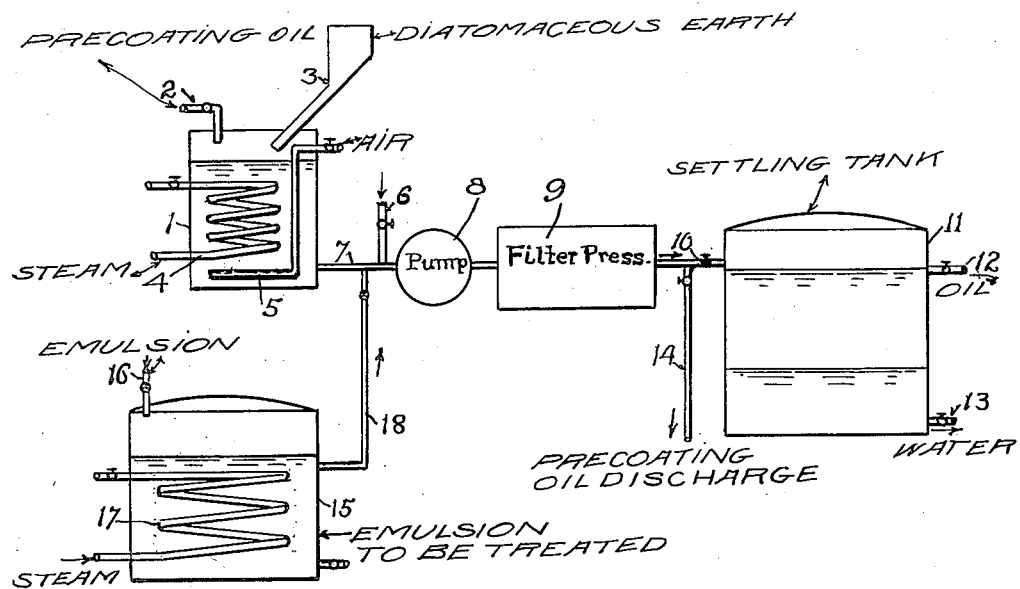
Inventor:
Charles V. Zoul
by Arthur P. Knight
Attorney.

Patented July 15, 1924.

1,501,877

UNITED STATES PATENT OFFICE.

CHARLES V. ZOUL, OF SANTA MONICA, CALIFORNIA.

PROCESS FOR DE-EMULSIFYING LIQUIDS.

Application filed December 11, 1922. Serial No. 606,288.

*To all whom it may concern:*

Be it known that I, CHARLES V. ZOUL, a citizen of United States, residing at Santa Monica, in the county of Los Angeles and State of California, have invented a new and useful Process for De-Emulsifying Liquids, of which the following is a specification.

This invention relates to the separation of the constituents of emulsions or liquids composed of a liquid or a solid dispersed in a liquid in which it is insoluble or immiscible. The invention is particularly applicable to the breaking up of emulsions of water and oils or fats, whether animal, marine, vegetable or mineral, but is applicable also to other emulsions or disperse systems.

The main object of the present invention is to provide for de-emulsifying such emulsions by subjecting the emulsion to contact with a material which will act as the de-emulsifying agent. I have found that by subjecting emulsions, for example, emulsions of oil in water or fat in water, to contact with diatomaceous earth under proper conditions, that the emulsifying quality or property of the liquid is eliminated so that the liquid after such treatment readily settles or separates into its constituents. I have also found that in this operation a more effective de-emulsification can be secured by causing the de-emulsifying agent (diatomaceous earth) to be first brought into contact with, or wetted with, one of the constituents of the emulsion; namely, for example, the oleaginous constituent, and an important part of the present invention is to carry on the operation in such manner as to insure such initial contact of one of the constituents with the de-emulsifying agent.

A further object of the invention is to provide for carrying out the de-emulsifying operation under certain conditions so as to avoid loss of one of the constituents of the emulsion; for example, a more volatile constituent such as gasoline. For this purpose my invention provides for carrying out the de-emulsifying operation wholly in enclosed chambers or apparatus so as to avoid evaporation of such volatile constituent.

The diatomaceous earth which is preferably used in carrying out my invention is a siliceous porous mineral, otherwise known as kieselguhr and sometimes called infusorial earth, and consists mainly of silica, with small portions of clay, combined water and other constituents, this material having marked absorptive and adsorptive properties. The action of the material in de-emulsifying certain emulsions, for example, emulsions of oil and water, is presumably due to the absorption or adsorption, by the material, of certain emulsifying or dispersing agents, either solid, liquid or gaseous, present in the emulsion. After the emulsion has been in contact with such material the constituents of the emulsion readily separate, and such separation may be, and preferably is, effected by settling, centrifugal or other operation dependent on the difference in densities of such constituents.

The accompanying drawing is a diagrammatic side elevation of appartus suitable for carrying out the invention.

Referring to said drawing the apparatus shown therein comprises a tank 1 for receiving precoating material including oil supplied by pipe 2, and finely divided diatomaceous earth supplied by suitable feed means 3. Said tank is further provided with heating means such as a steam coil 4 and with means indicated at 5 for introducing air into the body of liquid in the tank for agitating the same.

From the tank 1 a pipe line 7 may lead to a pump 8 by which the precoating mixture is forced into and through a filter-press indicated at 9, the outlet pipe 10 from said filter-press leading to a settling tank 11, having outlet pipes 12 and 13 for drawing off oil and water respectively. Said outlet pipe 10 of the filter-press may further be provided with a pipe 14 through which the precoating oil may be discharged.

15 indicates a tank or reservoir for the emulsion to be treated, said tank or reservoir having means indicated at 16 for supplying the emulsion thereto and with heating means such as steam coil 17. An outlet pipe 18 leads from the tank 15 to a suitable pump for forcing the emulsion into the filter-press, for example, to the pump 8 aforesaid. Suitable valves are provided in the various pipes, as indicated, to control the flow of liquid therethrough.

My invention is preferably carried out in the following manner: a quantity of powdered or finely divided diatomaceous earth, preferably in dry condition, is first mixed in the tank 1 with a suitable oil, for example, oil of the same kind as is contained in the emulsion to be treated, except that the oil which is mixed with the diatomaceous earth is in a dried or dehydrated condition. Such dehydration or drying of the oil may be effected by heat or by blowing air through a body of the oil, preferably while it is heated, or, if desired, a portion of the oil dehydrated by the operation of this invention, may be used. Or the oil may be heated and powdered diatomaceous earth added thereto and air blown through the mixture, the resulting dry mixture of oil and diatomaceous earth being forced through the filter press to form the coating referred to hereinafter. Or the water in the oil may be absorbed in a separate lot of diatomaceous earth which is then filtered out and the oil so dried mixed with fresh diatomaceous earth to form the suspension for coating the filter surface of the filter press. The use of dry or anhydrous oil in making the suspension is desirable in that it makes both the diatomaceous earth and filtering surfaces water repellent. It is advisable to wet the diatomaceous earth and filtering surfaces with the constituent which forms the outer or continuous phase of the emulsion in order to obtain the best results. Sufficient oil is taken in any case to suspend the diatomaceous earth used for the process to form a sufficiently mobile liquid to enable it to be pumped and forced through the filter press $a$. The mixture of diatomaceous earth and dried oil is then pumped or forced through a filter press so that the diatomaceous earth is arrested by the filter surface or medium (filter cloth) and forms a so-called pre-coat or a coating of the diatomaceous earth on the filtering surface or medium, the thickness of this pre-coat or coating depending on the amount of diatomaceous earth used and being from say $\frac{1}{16}$ of an inch to $\frac{1}{8}$ inch or over according to the requirements of the process. If necessary, the mixture of dehydrated oil and diatomaceous earth used in the above described operation may be heated to increase the fluidity of the mixture which is forced into the filter press. The filter press used in the operation may be of the plate, or "plate and frame" type and the pressure used in the operations herein described will in any case be controlled so as to provide for the required velocity of filtration.

In some cases it will be found that the "liquor spaces" in the filter press, will contain considerable diatomaceous earth in suspension in the oil, and in order to insure deposition of such suspended material on the filter cloths, clear dry oil, of the same kind as that being treated, but free from water, may be forced from the pipe indicated at 6 through the filter press until all of the diatomaceous earth is deposited as a coating on to the cloth.

The emulsion to be treated consisting, for example, of emulsion or petroleum and water, is then forced from the tank into the filter press and through the filtering medium and the pre-coat or coating formed thereon, as above described. In case the emulsion to be treated is sufficiently fluid at ordinary temperatures, it may be forced into the filter press without heating, but in case the emulsion is of a viscous nature, it may be heated, say to 100° to 160° F., more or less, so as to render it sufficiently fluid to be forced readily into and through the filter press; in any case the temperature of the emulsion should not be raised much above the boiling point of any volatile constituent, such as gasoline, or any volatile solvent present therein in any considerable quantity. In order to insure that there will be no loss of such volatile constituent, I prefer to carry out the entire operation including the heating of the emulsion, if necessary, pumping of same, the filtration thereof in the filter press, and withdrawal of the filtrate from the filter press, in completely enclosed apparatus; the heating tank, if any, the pump, the connections thereof to the filter press, and the filter press itself and its outlet, being all enclosed substantially gas tight, so as to prevent escape of gasoline or other volatile constituent therefrom. In passing through the filter press, the emulsion is brought temporarily into contact with the pre-coat or coating of diatomaceous earth within the filter press, so that the filtrate which passes through the filter press and which contains, for example, both the oil and water of the emulsion, readily separates on standing into its oil and water constituents. The pre-coating or provision of an oil wetted coat of the diatomaceous earth on the filtering surface in the filter press, not only enables a cleaner and more rapid filtration of the emulsion and a more effective removal of the emulsifying agent, but enables a given quantity of diatomaceous earth to treat or de-emulsify an extremely large quantity of emulsion without losing its de-emulsifying property.

The filtrate or liquid which passes through the filter press is then allowed to stand in tank 11 or be subjected to any other operation such as centrifuging, to effect settling or separation by gravity or difference in density of the oil and water, or other immiscible constituents thereof. In case the liquid contains a volatile constituent such settling or separating action is preferably effected in an enclosed chamber so as to prevent escape and loss of such volatile constituent during the settling or separating operation.

The process is applicable to any emulsion, for example, emulsions of tallow or fat and water, such as are produced in the tallow or lard industries, the tallow or fat being in that case heated to sufficient temperature to produce an emulsion which is sufficiently fluid to enable it to be pumped through a filter press with the required rapidity, and in general in the treatment of any emulsion by this process, the filtering and settling operations will be effected at a temperature which is most suitable and economical for the purpose, the emulsion being heated, if necessary, to bring it to such temperature as will provide for the desired rapidity of filtration and of settling after the emulsion has been broken up by the filtration through the diatomaceous earth.

The amount of diatomaceous earth required for the de-emulsification of the emulsion will vary according to the character of the emulsion and the amount of de-emulsification required. By using from one-tenth per cent to one per cent of diatomaceous earth with a petroleum emulsion, the water content thereof may be reduced from say 45 per cent to less than one per cent.

The thickness of the pre-coat or coating formed on the filter press filtering medium, may be varied according to requirements and the pressure at which the filter press is operated may also be varied so as to obtain a more thorough de-emulsification or a higher rate of flow. Moreover said variation of thickness of the pre-coat or coating of diatomaceous earth may be effected either before or during the run of the emulsion through the filter press. Thus, if it is found by reason of variation in condition of the emulsion being treated that the coating is too thin, it may be built up to a greater thickness by temporarily passing a quantity of powdered diatomaceous earth suspended in dried oil through the filter press until the required thickness of coating is attained. Or, in such cases additional wetted diatomaceous earth as described may be mixed with the emulsion which is being forced through the filter press, to increase the thickness of the coating therein.

In some cases, I may provide for forming the pre-coat or coating on the filtering medium by first forming a mixture of diatomaceous earth with dry or dehydrated oil, for example, oil of the same kind as is contained in the emulsion to be treated and then mixing this suspension of diatomaceous earth in dried oil in the emulsion to be treated, the resulting mixture being forced into and through the filter press with the result that a pre-coat or coating of oil wetted diatomaceous earth is formed on the filter medium in the filter press and the emulsion which passes through such coating loses its emulsifying property so that the filtrate passing from the filter press readily separates into the oil and water constituents thereof. When the filter medium and filter press has thus been coated to the required thickness by the diatomaceous earth the straight or unmixed emulsion at suitable temperature is forced through the filter press to de-emulsify the same, this operation being continued as long as the coating formed on the filter press or filtering medium retains its de-emulsifying property to a satisfactory degree, the filtrate passing through the filter press is then subjected to suitable separating action, by settling or otherwise, to recover the oil separated from the water. If desired, the operation may be carried out so that the mixture, formed by suspending diatomaceous earth in dry oil and adding the product to the emulsion may be supplied to the filter press during the whole operation, in which case the coating of diatomaceous earth on the filter surface gradually builds up or increases in thickness during the whole operation.

The formation of an oiled pre-coat on the filter medium in the filter press, is generally desirable in order to render the de-emulsification more effective and rapid, but with some emulsions, for example, fish oil, or animal oil emulsions, a small percentage of diatomaceous earth wetted as described should be added to the main body of the liquor in addition to the pre-coat formed as above described. My invention may be applied to the de-emulsification of tallow, produced by steam rendering of animal fats; such tallow containing about .5 to 3 per cent of water which does not settle out on melting the tallow, and is, therefore, emulsified with the tallow, removal of such water improving the keeping qualities and increasing the desirability of the product. The tallow is heated to about 200° F. and about one per cent of finely divided diatomaceous earth added, and mixed with the melted tallow emulsion, and the liquid mixture then pumped through a filter press while still hot, the said filter press having been precoated with diatomaceous earth, wetted as above stated, with the oily constituent of the emulsion or a liquid miscible with said constituent, the melted tallow and the water content thereof passing freely through the filter press, but the diatomaceous earth being retained in the filter press, together with any materials absorbed or adsorbed thereby. If a bleaching effect is desired, a certain amount of Fuller's earth, say two or three per cent, may be added to the liquid before the filtering operation, or it may be added after the filtering operation, and the filtration afterward repeated. Air may be blown through the heated emulsion either before or after the addition of diatomaceous earth thereto. After the tallow and water have been treated with diatomaceous earth, and passed through a precoated filter press as above described, they are readily separable by filtering and by allowing the filtered liquid to stand in a receptacle, or to move through a receptacle with sufficiently low velocity, the water is caused to settle out and the melted tallow is decanted therefrom substantially free from water. The bleaching effect of the Fuller's earth is much more pronounced and effective when the tallow has been de-emulsified by the action of the diatomaceous earth, as above described.

In the extraction of fats or oils from animal or vegetable products, by the use of a solvent, such as gasoline, benzol, etc., emulsions are liable to occur, containing the fat or oil as well as other substances, emulsified in the saturated solvent. My process of treatment with diatomaceous earth, as above described, may be used to break up such emulsions, the solution of the fat or oil in the solvent being then separated from the undissolved fat or oil by settling following the filtration. For example, this process may be applied with advantage to the extraction of linseed oil, using gasoline as a solvent. In such extraction, the resulting solution is generally cloudy, but by filtering it through a layer of diatomaceous earth, which has been wetted with one of the oily constituents of the emulsion, in the manner above described, or by adding finely diatomaceous earth to it and then filtering, through a filter precoated as above described the emulsifying property is destroyed, so that a clear solution is obtained by allowing the liquid to stand and settle. Such clear solution is then treated in the usual manner, to recover the solvent.

The diatomaceous or so-called infusorial earth used in any of the above described applications of my process may be the ordinary commercial diatomaceous or infusorial earth, in its natural condition, crushed or ground to a suitable state of division, with or without drying, or it may be calcined at a suitable temperature, before or after crushing or grinding, to improve the action of the material, or said material may be otherwise prepared for the use in the process.

I am aware that it has been proposed to pass emulsions through diatomaceous earth or other porous material to break up the emulsion, but such processes have not heretofore been successful for the reason that they were not carried out in such manner as to form a uniform and effective de-emulsifying coating of wetted diatomaceous earth on the filter member, as above described, and, furthermore, did not allow treatment of large volumes of emulsion during one operation, making the process of de-emulsification uneconomical, and in particular no provision was made for ensuring the uniform wetting of the diatomaceous earth with the oily or outer phase constituent of the emulsion, this being essential in many cases for successful operation of the process.

The oil used for suspending the diatomaceous earth in forming the pre-coat may be any suitable liquid, for example, gasoline, kerosene or other solvent, if desired, in place of the dried oil as above stated.

In applying pre-coat of diatomaceous earth as above indicated it is necessary to use a uniform and rapid flow of this suspension through the filter press. This is best obtained by using low pressures on the pre-coating liquor thus obtaining a pre-coat which has been applied without any opportunity for compacting, segregating or otherwise gravitationally classifying. Such a detailed operation, carefully controlled, gives a pre-coat of highest efficiency for de-emulsification.

I do not in this application claim the method of de-emulsifying emulsions wherein the finely divided material or diatomaceous earth for the coating is wetted with one of the constituents of the emulsion to be treated other than its oily constituent, or with a liquid immiscible with the oily constituent thereof, to form the precoat, the method referred to forming the subject matter of an application filed June 20, 1924, Serial No. 721,190, which is a continuation in part of this application.

What I claim is:

1. A process of de-emulsifying oily emulsions, consisting in wetting a filter material with a liquid miscible with the oily constituent of the emulsion to be treated; passing the emulsion through such wetted filtering material; and then separating the filtrate.

2. The process of de-emulsifying oily emulsions, consisting in wetting diatomaceous earth with a liquid miscible with the oily constituent of the emulsion to be treated; passing the emulsion through a layer of such wetted diatomaceous earth; and then separating the filtrate.

3. A process of de-emulsifying oily emulsions, consisting in wetting a filter material with a liquid miscible with the oily constituent of the emulsion to be treated, pre-coating a filtering surface with such wetted material, passing the emulsion through such precoated filtering surface; and then separating the filtrate.

4. A process of de-emulsifying oily emulsions, consisting in wetting diatomaceous earth with a liquid miscible with the oily constituent of the emulsion to be treated, precoating a filtering surface with such wetted diatomaceous earth, passing the emulsion through such precoated filtering surface; and then separating the filtrate.

5. The process of treating an emulsion which consists in passing the same through a filter body composed of diatomaceous earth previously wetted with a substantially anhydrous oil miscible with the external phase of such emulsion.

6. The process of treating emulsions of hydrocarbon oil and water which consists in mixing diatomaceous earth with a substantially anhydrous hydrocarbon oil, passing such oil through a filtering apparatus so as to form a coating of oil wetted diatomaceous earth on the filtering surface of such apparatus, passing the emulsion to be treated through such coating to de-emulsify the emulsion and subjecting the filtrate to separating action to separate the constituents thereof.

7. A process as set forth in claim 6 in which the emulsion is heated so as to increase its fluidity preparatory to being passed through the said coating.

8. A process as set forth in claim 6 in which the de-emulsifying and separating actions are carried on in a closed system to avoid evaporation of a volatile constituent.

9. A process of treating emulsions of oil and water which consists in mixing powdered diatomaceous earth with substantially water free oil substantially the same as the oil of the emulsion, passing such mixture through a filtering apparatus so as to form a coating of oil wetted diatomaceous earth on the filtering surface of such apparatus, passing the emulsion through this coating, and subjecting the filtrate to separating action to separate the constituents thereof.

10. A process as set forth in claim 9 in which the emulsion is heated so as to increase its fluidity preparatory to being passed through said coating.

11. A process as set forth in claim 9 in which the de-emulsifying and separating actions are carried on in a closed system to avoid evaporation of a volatile constituent.

12. In the process of de-emulsification of emulsions of oil and water the step which consists in mixing diatomaceous earth with a substantially anhydrous oil and forcing the mixture under pressure into a filter press to form a precoat of oil wetted diatomaceous earth upon the filtering surface in said filter press.

13. A process as set forth in claim 12, in which said oil is heated before being forced into the filter press.

14. A process of treating petroleum oils having a water emulsion content, which consists in passing such petroleum oil through a filtering material previously wetted with a substantially water free hydrocarbon oil; and then permitting the filtrate to separate.

15. A process of treating petroleum oil emulsions which consists in passing such emulsions through diatomaceous earth previously wetted with a substantially anhydrous petroleum oil; and permitting the filtrate to separate.

16. The process as set forth in claim 15, in which the emulsion is heated before being forced through said filter body.

In testimony whereof I have hereunto subscribed my name this 5th day of December 1922.

CHARLES V. ZOUL.